United States Patent
Berry et al.

(10) Patent No.: US 8,738,251 B2
(45) Date of Patent: May 27, 2014

(54) POWER SOURCE SPEED AND CLUTCH CONTROL SYSTEM FOR A MACHINE WITH AN IMPLEMENT

(75) Inventors: Jeffrey K. Berry, Yorkville, IL (US); Timothy A. Evans, Edwards, IL (US); Barry Mei, Oswego, IL (US)

(73) Assignee: Caterpillar Inc., Peoria, IL (US)

( * ) Notice: Subject to any disclaimer, the term of this patent is extended or adjusted under 35 U.S.C. 154(b) by 211 days.

(21) Appl. No.: 13/316,987

(22) Filed: Dec. 12, 2011

(65) Prior Publication Data
US 2013/0151098 A1    Jun. 13, 2013

(51) Int. Cl.
*G06F 19/00* (2011.01)

(52) U.S. Cl.
USPC ............... 701/54; 701/50; 701/67; 477/110

(58) Field of Classification Search
USPC .......... 701/50, 54, 67, 69; 477/110, 174, 180; 180/53.4
See application file for complete search history.

(56) References Cited

U.S. PATENT DOCUMENTS

| | | | |
|---|---|---|---|
| 5,121,820 A * | 6/1992 | Brown et al. | 701/105 |
| 5,417,621 A | 5/1995 | Tibbles | |
| 5,720,358 A | 2/1998 | Christensen et al. | |
| 2006/0245896 A1 | 11/2006 | Alshaer et al. | |
| 2007/0010927 A1 | 1/2007 | Rowley | |
| 2008/0076635 A1 | 3/2008 | Lee et al. | |
| 2010/0114440 A1 | 5/2010 | Lin | |

FOREIGN PATENT DOCUMENTS

| | | |
|---|---|---|
| GB | 2281952 | 3/1995 |
| JP | 2003009308 | 1/2003 |

* cited by examiner

*Primary Examiner* — Thomas Tarcza
*Assistant Examiner* — Kevin Myhre
(74) *Attorney, Agent, or Firm* — Miller, Matthias & Hull; Leonard Stewart

(57) ABSTRACT

A machine control system including an impeller clutch pedal sensor, a power source sensor, a torque converter output speed sensor, an implement lever sensor and a controller is provided. The impeller clutch pedal sensor is configured to generate a signal indicative of an impeller clutch command. The implement lever sensor is configured to generate a signal indicative of a desired hydraulic flow corresponding to an implement lever command. The controller is configured to determine a desired output torque, at a current torque converter output speed, based on the signals from the impeller clutch pedal sensor and the power source sensor. The controller is configured to modulate at least one of the speed of the power source or an engagement of an impeller clutch based on the desired output torque and the implement lever command.

22 Claims, 8 Drawing Sheets

POWER SOURCE SPEED AND CLUTCH CONTROL SYSTEM FOR A MACHINE WITH AN IMPLEMENT

TECHNICAL FIELD

The present disclosure relates generally to a machine and, more particularly, to a control system coupled with the machine.

BACKGROUND

A machine may include a control system which is configured to control the operation of a clutch by sending appropriate signals to the clutch. United States Patent Application Publication Number 2010/012220 A1 relates to a machine control system for use with a machine having a power source and a transmission. The machine control system may have a clutch configured to connect an output of the power source with an input of the transmission. The machine control system may also have sensors configured to generate signals indicative of machine operations, and a controller in communication with the clutch and the sensors. The controller may be configured to determine the current machine application based on the signals, and vary an actuating force of the clutch based on the type of the machine application.

SUMMARY OF THE DISCLOSURE

In one aspect, the present disclosure provides a machine control system including an impeller clutch pedal sensor, a power source sensor, a torque converter sensor, an implement lever sensor, a torque converter output speed sensor, and a controller. The impeller clutch pedal sensor is configured to generate a signal indicative of an impeller clutch command. The power source sensor is configured to generate a signal indicative of a speed of a power source. The torque converter sensor is configured to determine the output speed of the torque converter. The implement lever sensor is configured to generate a signal indicative of a desired hydraulic flow corresponding to an implement lever command. The controller is in communication with the impeller clutch pedal sensor, the torque converter sensor, the implement lever sensor, and the power source sensor. The controller is configured to determine a desired output torque, at a current torque converter output speed, based on the signals from the impeller clutch pedal sensor and the power source sensor. The controller is also configured to modulate at least one of the speed of the power source or an engagement of an impeller clutch based, at least in part, on the desired output torque and the implement lever command.

In another aspect, the present disclosure provides a method for providing desired output torque. The method receives one or more signals indicative of an impeller clutch command, a power source speed, a torque converter output speed, and an implement lever command. The method determines a desired output torque, at a current torque converter output speed, based on the received signals corresponding to the impeller clutch command and the power source speed. The method then modulates at least one of the speed of a power source or an engagement of an impeller clutch based, at least in part, on the determined desired output torque and the received signal corresponding to the implement lever command.

Other features and aspects of this disclosure will be apparent from the following description and the accompanying drawings.

DETAILED DESCRIPTION

Figure 1:
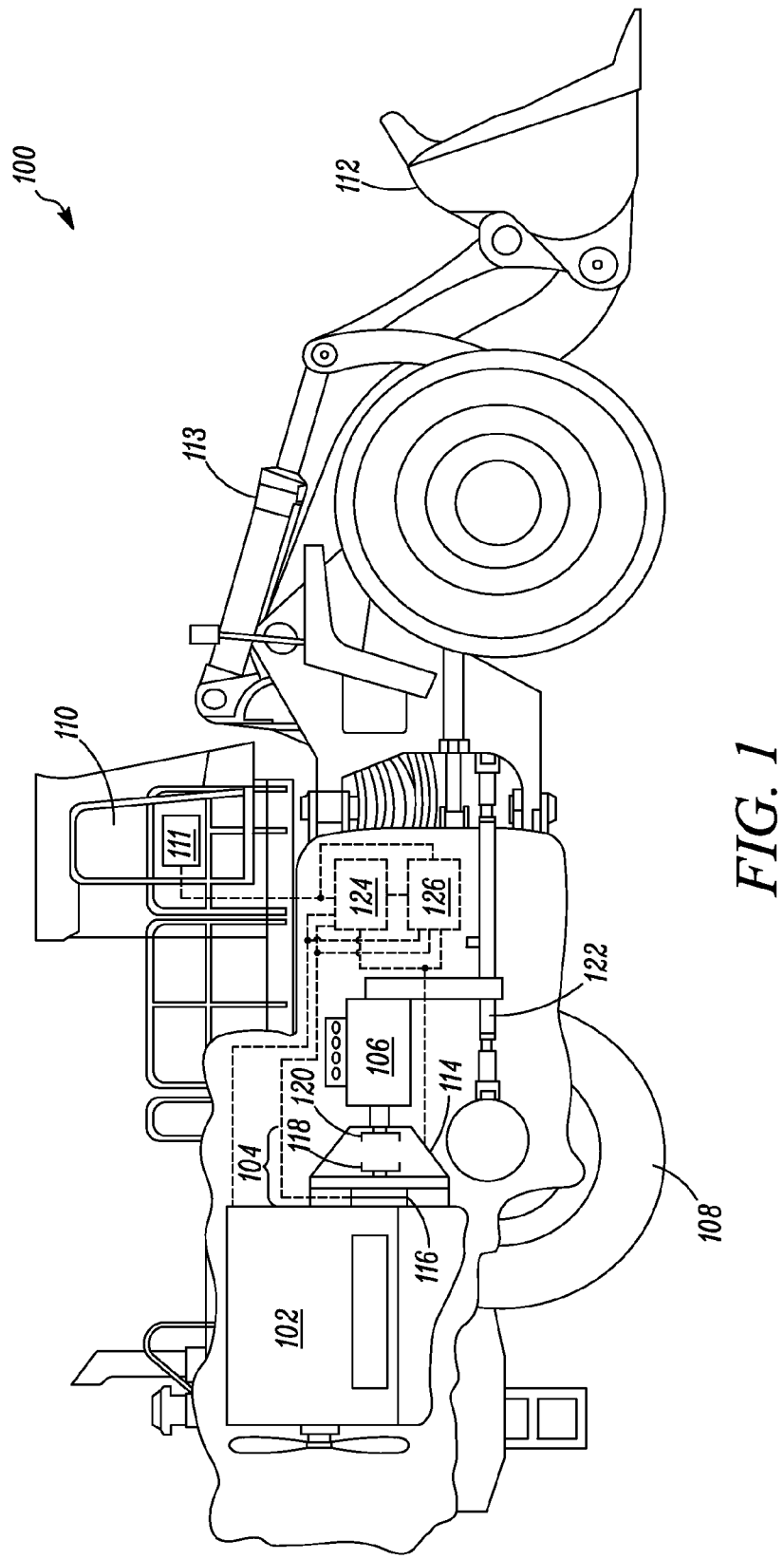
FIG. 1 is a diagrammatic illustration of an exemplary disclosed machine.

FIG. 1 illustrates an exemplary machine 100. The machine 100 may embody a mobile machine that performs some type of operation associated with an industry such as mining, construction, farming, transportation, or any other industry known in the art. For example, the machine 100 may be an earth-moving or material-handling machine such as a wheel loader, an off-highway haul truck, a motor grader, or any other suitable earth moving machine. The machine 100 may alternatively embody an on-highway vocational truck, a passenger vehicle, or any other operation-performing machine. The machine 100 may include, among other things, a power source 102, a torque converter assembly 104, a transmission 106 operatively connected between the torque converter assembly 104 and a traction device 108, an operator station 110 and an implement 112 to perform desired operations such as digging, mining, and the like.

The power source 102 may produce a power output having both torque and rotational speed components (i.e., Power=Torque×Speed, wherein Speed may be a rotational speed, for example, of a shaft), and may embody an internal combustion engine. For example, the power source 102 may embody a diesel engine, a gasoline engine, a gaseous fuel-powered engine, or any other engine apparent to one skilled in the art. The power source 102 may contain an engine block having a plurality of cylinders (not shown), reciprocating pistons disposed within the cylinders (not shown), and a crankshaft operatively connected to the pistons (not shown). The internal combustion engine may use a combustion cycle to convert potential energy (usually in chemical form) to a rotational output of the crankshaft, which may in turn rotate an input of the torque converter assembly 104.

The torque converter assembly 104 may be used to transmit torque from the power source 102 to the transmission 106. The torque converter assembly 104 may include a torque converter 114 and an impeller clutch 116. The torque converter 114 may be a hydro-mechanical device configured to transmit torque from the power source 102 to the transmission 106. The torque converter 114 may allow the power source 102 to rotate somewhat independently of the transmission 106. For example, the torque converter 114 may contain an impeller 118 and a turbine 120. The impeller 118 may be connected to an output of the impeller clutch 116. It is also contemplated that the impeller 118 may alternatively be directly connected to the power source 102 (i.e., directly connected to the crankshaft of the power source 102), and another clutch may be located on an output side of the torque converter 114, if desired. For example, a first clutch (not shown) of the transmission 106 may perform a function similar to that performed by the impeller clutch 116.

The impeller 118 may rotate as a result of power source operation (dependent on the degree of impeller clutch engagement). This rotation of the impeller 118 may thus impart momentum to fluid within the torque converter 114. The turbine 120, connected to the transmission 106, may receive this momentum, thus causing the turbine 120 and the transmission 106 to rotate. At low fluid flow rates and pressures, the impeller 118 may rotate at a higher speed relative to the turbine 120. However, as the pressure and the flow rate of the fluid conducted between the impeller 118 and the turbine 120 increase, the rotational speed of the turbine 120 may approach the rotational speed of the impeller 118.

The impeller clutch 116 may allow variable engagement between the power source 102 and the transmission 106. Specifically, the impeller clutch 116 may allow the power source 102 to rotate at a relatively high speed and high torque, while allowing the transmission 106 to rotate at a lower speed and/or with reduced torque. The impeller clutch 116 may embody a disc-type clutch located between the output of the power source 102 and the input of the torque converter 114. The impeller clutch 116 may contain an input disk and an output disk. The input disk may be connected to the power source 102 and may rotate as a result of the power source operation. The output disk may be oriented substantially coaxially relative to the input disk and may be connected to the input of the torque converter 114.

The input disk and the output disk of the impeller clutch 116 may be selectively engaged by a hydraulic and/or mechanical actuator that axially presses the disks together, thus allowing frictional forces to couple the rotation of the input disk to the rotation of the output disk or vice versa. The magnitude of the pressure applied to the impeller clutch disks may be related to the magnitude of the frictional forces and, subsequently, to the magnitude of the torque transmitted between the power source 102 and the transmission 106. The impeller clutch 116 may reduce the coupling of the power source 102 to the transmission 106 by decreasing the degree of frictional engagement between the input disk and the output disk, thus allowing the disks to rotate more freely relative to each other. Similarly, the impeller clutch 116 may increase the coupling of the power source 102 to the transmission 106 by increasing the degree of frictional engagement between the input disk and the output disk (i.e., by increasing the pressure forcing the disks together). It is contemplated that the impeller clutch 116 may be activated manually, as will be described below, or automatically via a controller (not shown). The impeller clutch 116 may generate a signal indicative of its degree of engagement.

The transmission 106 may include numerous components that interact to transmit power from the power source 102 to the traction device 108. In particular, the transmission 106 may embody a multi-speed, bidirectional, mechanical transmission having a neutral position, a plurality of forward gear ratios, one or more reverse gear ratios, and one or more clutches (not shown) for selectively engaging predetermined combinations of gears (not shown) that produce a desired output gear ratio. The transmission 106 may be an automatic-type transmission, wherein shifting is based on a power source speed, a maximum operator selected gear ratio, and a shift map stored within a transmission controller. Alternatively, the transmission 106 may be a manual transmission, wherein the operator manually engages the actual gear combinations. The output of the transmission 106 may be connected to rotatably drive the traction device 108 via a shaft 122, thereby propelling the machine 100. It is contemplated that the transmission 106 may alternatively include only a single gear combination or no gear combinations at all, if desired, such as in a continuously variable or parallel path type of transmission.

The traction device 108 may include wheels located on each side of the machine 100 (only one side shown). Alternately, the traction device 108 may include tracks, belts, or other driven traction devices. The traction device 108 may be driven by the transmission 106 to rotate in accordance with an output rotation of the transmission 106.

The operator station 110 may include one or more operator interface devices 111. The operator interface devices 111 may be located proximal to an operator seat and may embody, for example, a pedal, single or multi-axis joysticks, wheels, knobs, push-pull devices, switches, and other operator interface devices known in the art.

Further, the machine 100 may also include a controller 124 which is communicably coupled with the power source 102, the torque converter assembly 104, and the operator interface devices 111 in the operator station 110. The controller 124 may communicate with the power source 102, the torque converter assembly 104, and the operator interface devices 111 in the operator station 110 via a plurality of sensors 126, such as power source sensor, interface devices sensors, implement lever sensors (explained in detail in conjunction with FIG. 2), and the like, to achieve a desired output torque to the ground, by modulating a combination of the power source speed and an engagement of the impeller clutch 116.

Figure 2:
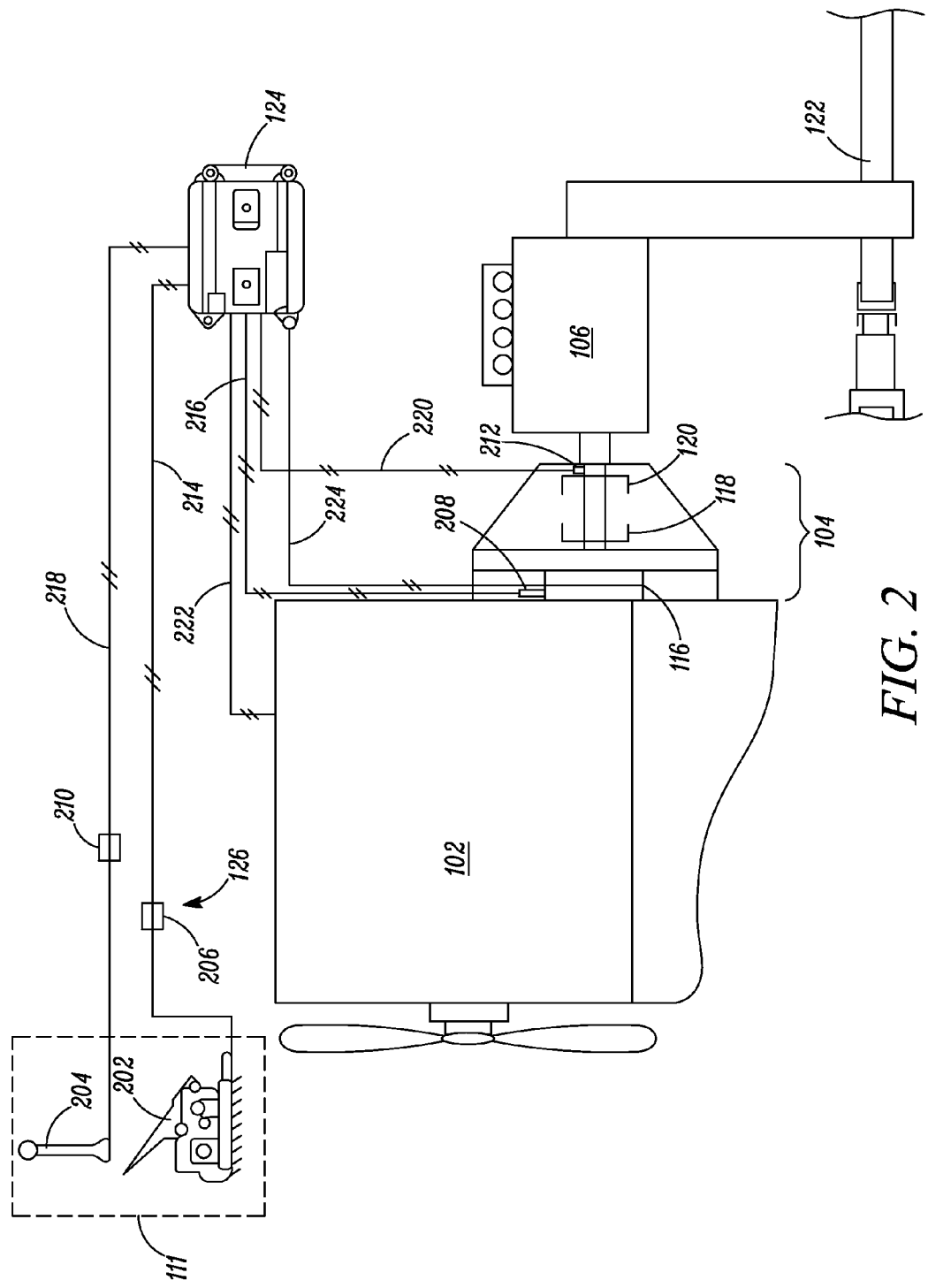
FIG. 2 is a diagrammatic illustration of an exemplary disclosed control system that may be used with the machine of FIG. 1.

As shown in FIG. 2, the operator interface device 111 in the operator station 110 may include an impeller clutch pedal 202 and an implement lever 204.

The impeller clutch pedal 202 may be manually actuated to allow variable control of the impeller clutch 116 and a friction type brake mechanism (not shown). A degree of the impeller clutch pedal actuation may be related to a degree of a coupling engagement between the power source 102 and the transmission 106 which is affected by the impeller clutch 116, as will be described in more detail below. The impeller clutch pedal 202 may be movable through a range of motion from a neutral position to a maximum displaced position. As the impeller clutch pedal 202 is displaced away from the neutral position, a signal indicative of the displaced position may be generated. In some embodiments, the displaced position may be related to an operator desired reduction in the amount of torque transmitted from the power source 102 to the transmission 106.

The range of motion of the impeller clutch pedal 202 may be divided into different portions. For example, some portion of the range of motion (i.e., about the first 6%) may be considered a deadband portion. When displaced to a position within the deadband, movement of the impeller clutch pedal 202 may have little effect on an operation of the impeller clutch 116. That is, when in the neutral position or displaced within the first 6% of its range of motion, the impeller clutch pedal 202 may signal for the impeller clutch 116 to remain fully engaged. Similarly, some portion of the range of motion (e.g., about the last 50%) may be used to actuate the brake mechanism. As the operator depresses the impeller clutch pedal 202, the impeller clutch 116 may disengage until it is almost fully disengaged at around 50% of the travel of the impeller clutch pedal 202. And, if the operator continues to depress the impeller clutch pedal 202 through the remaining 50% of the range of motion, the brake mechanism may become engaged and engage to an increasing degree as the impeller clutch pedal 202 is depressed further. In some embodiments, the brake mechanism may engage as soon as at about 40% of the impeller clutch pedal travel. It is contemplated that the impeller clutch pedal 202 may embody a mechanical device, an electrical device, a hydraulic device, or any other type of device known in the art.

The implement lever 204 may be manually actuated to receive a desired hydraulic flow corresponding to an implement lever command. Depending upon the required operation, different commands, such as a tilt command, a lift command, and/or a steering command may be provided by the operator of the machine 100 through the implement lever 204. There is a minimum power source speed requirement to meet the desired hydraulic flow corresponding to the implement lever command. For example, a lowest possible power source speed may be required when a pump of the steering and the implement 112 are fully up-stroked and producing a maximum flow. In an embodiment, if the implement 112 is a bucket attached to the machine 100 by a linkage 113, then a minimum power source speed may be required to rack the bucket at a proper speed even when the linkage 113 is lowering. There may be different power source speed requirements, when the implement lever command corresponds to single function rackback, dual function rackback and raise, or dual function rackback and lower. Similarly, there may be different power source speed requirements when the implement lever command corresponds to both dump (gravity driven function) and raise the bucket (pump driven function) command.

As illustrated in FIG. 2, the controller 124 is communicably connected to the plurality of sensors 126 such as an impeller clutch pedal sensor 206, a power source sensor 208, an implement lever sensor 210 and a torque converter output speed sensor 212. The controller 124 is in communication with the impeller clutch pedal sensor 206, the power source sensor 208 and the implement lever sensor 210 and the torque converter output speed sensor 212 via communication lines 214, 216, 218 and 220 respectively.

The impeller clutch pedal sensor 206 is coupled to the impeller clutch pedal 202. The impeller clutch pedal sensor 206 is configured to generate a signal indicative of an impeller clutch command which in turn is indicative of an actuating force on the impeller clutch pedal 202. Further, the implement lever sensor 210 is configured to generate a signal indicative of an implement lever command. In one embodiment, the implement lever command may include the steering command, a lift command, a tilt command, and the like. The power source sensor 208 is configured to generate a signal indicative of a speed of the power source 102. In one embodiment, the signal from the power source sensor 208 may indicate a throttle pedal position of the power source 102. The throttle pedal position may vary between a minimum throttle pedal position corresponding to a minimum power source speed and a maximum throttle pedal position corresponding to a maximum power source speed.

The controller 124 is also in communication with the power source 102 and the impeller clutch 116 to issue one or more commands to the power source 102 and the impeller clutch 116 via communication lines 222 and 224 respectively. The controller 124 may be configured to determine the desired output torque to the ground at a current torque converter output speed from the torque converter output speed sensor 212, based on the signals received from the impeller clutch pedal sensor 206 and the power source sensor 208. In an embodiment, the power source speed may be maximum corresponding to a locked throttle pedal position or a maximum throttle pedal position. The controller 124 may subsequently determine a first required speed of the power source 102 to achieve the desired output torque to the ground, at the current torque converter output speed. Further, the controller 124 may also determine a second required speed of the power source 102 to meet the minimum desired hydraulic flow requirements corresponding to the implement lever command. The controller 124 may also determine a standby speed of the power source 102 in case the machine 100 is on a neutral transmission.

Further, the controller 124 may modulate the speed of the power source 102 by issuing a command to deactivate a throttle-lock pedal function. The modulation may involve comparing the first required speed of the power source 102, the second required speed of the power source 102, and the standby speed and subsequently, selecting the optimum of the three speeds as the desired speed of the power source 102. In an embodiment, the desired speed of the power source 102 may provide the minimum required speed to achieve the desired output torque to the ground, while maintaining the necessary hydraulic flow corresponding to the implement lever command. In one embodiment, the controller 124 issues a speed command via the communication line 222 to the power source 102 to vary the power source speed, based on the selected desired speed of the power source 102. The power source 102 may convert the speed command received from the controller 124 into throttle pedal positions by using the throttle pedal-based desired power source speed map in reverse. Thus, rather than the throttle pedal resulting in a desired power source speed, the received speed command from the controller 124 results in the throttle pedal positions.

In another embodiment, the controller 124 may modulate the engagement of the impeller clutch 116, if the optimally determined desired engine speed is greater than the speed (first required speed) of the power source 102 to attain the desired output torque to the ground. In such cases, since the controller 124 may select the second required speed corresponding to the implement lever command or the standby speed as the desired power source speed, the impeller clutch 116 needs to be slipped to attain the desired output torque to the ground, at the current torque converter output speed. Also, in situations when the selected desired speed of the power source 102 may not respond fast enough to a change in the desired output torque, then the controller 124 may change the level of engagement of the impeller clutch 116 or slip the impeller clutch 116 to attain the desired output torque to the ground, at the current torque converter output speed.

In an embodiment, an impeller speed sensor (not shown in figure) may be used to generate a signal indicative of a speed of the impeller 118 in the torque converter 114. The signal indicative of the impeller speed may be used as a closed loop feedback control to eliminate inaccuracies in determining the desired engagement of the impeller clutch 116 due to variations in various components of the controller 124 or internal variations of the machine 100 such as break in or wear out of the impeller clutch 116 and the like. The impeller speed sensor signal may be utilized with respect to proportional-integral-derivative controller (PID) to identify the required correction in the engagement of the impeller clutch 116. Subsequently, the controller 124 may issue a command to the impeller clutch 116 via the communication line 224 to modulate the engagement of the impeller clutch 116.

It is also considered that the controller 124 may include one or more maps stored within an internal memory of the controller 124 and that the controller 124 may reference these maps during the regulation of the impeller clutch 116 and the speed of the power source 102. Each of these maps may include a collection of data in the form of tables, graphs, and/or equations. For example, one map may relate a speed of the power source 102 as measured by the power source sensor 208, and a displacement position of the impeller clutch pedal 202 to an activation pressure or force of impeller clutch 116 that results in an operator desired amount of torque being transferred from the power source 102 to the transmission 106. Another map may be related to a speed of the power source 102 and the corresponding throttle pedal position and the like.

Thus, the controller 124 may facilitate in providing a fuel efficient system in which the desired output torque to the ground may be achieved by modulating the speed of the power source 102 to an extent allowable, and then resorting to changing the engagement of the impeller clutch 116. In another embodiment, the controller 124 may change the engagement of the impeller clutch 116 only if the speed of the power source 102 cannot be changed to maintain the minimum desired hydraulic flow requirement corresponding to the implement lever command.

The controller 124 may embody a single microprocessor or multiple microprocessors that include a means for receiving input from and providing output to the control system of the machine 100. Numerous commercially available microprocessors may be configured to perform the functions of the controller 124. It should be appreciated that the controller 124 may readily embody a general machine microprocessor capable of controlling numerous machine functions. Various other circuits may be associated with the controller 124, such as power supply circuitry, signal conditioning circuitry, data acquisition circuitry, signal output circuitry, signal amplification circuitry, and other types of circuitry known in the art.

The controller 124 may use any control method known in the art to regulate operation of the impeller clutch 116 such as, for example, bang-bang control, proportional control, proportional integral derivative control, adaptive control, model-based control, or logic-based control. The controller 124 may use either feed-forward or feedback control.

FIGS. 3 to 7 outline exemplary operations of the controller 124. These figures will be discussed in detail below.

INDUSTRIAL APPLICABILITY

The machine 100 may include on and off-highway haul and vocational trucks, wheel loaders, motor graders, and other types of heavy machinery that generally include a multi-speed, bidirectional, mechanical transmission drivingly coupled to the power source 102 by way of the torque converter assembly 104. The torque converter assembly 104 may include the impeller clutch 116 to allow the operator a degree of freedom in determining the slippage between an output shaft of the power source 102 and an input shaft of the torque converter 114.

Further, there may be different power source speed requirements corresponding to the various implement lever commands. Depending upon the required operation, different commands, such as tilt command, lift command, steering command and the like may be actuated by the operator of the machine 100 through the implement lever 204. Generally, in order to meet the desired hydraulic flow corresponding to various implement lever commands, the power source speed is kept at maximum by keeping a throttle-lock pedal function. Subsequently, in order to meet the desired output torque to the ground, an engagement of the impeller clutch 116 is always varied without varying the power source speed. This may lead to wastage of the fuel in the machine 100. The presently disclosed controller 124 may be applicable to any machine 100 having the impeller clutch 116 where responsiveness thereof affects performance of the machine 100. The disclosed system may provide a fuel efficient system for providing the desired output torque to the ground by modulating the speed of the power source 102 and/or the engagement of the impeller clutch 116 based on the desired output torque and the implement lever command.

During operation of the machine 100, the operator may set the speed of the power source 102 to high idle and engage a desired combination of gears within the transmission 106 to initiate travel. As the machine 100 is propelled, torque may be transferred from the power source 102 through the impeller clutch 116, from the impeller 118 to the turbine 120, and through the gearing of the transmission 106 to the traction device 108 (referring to FIG. 1).

Figure 3:
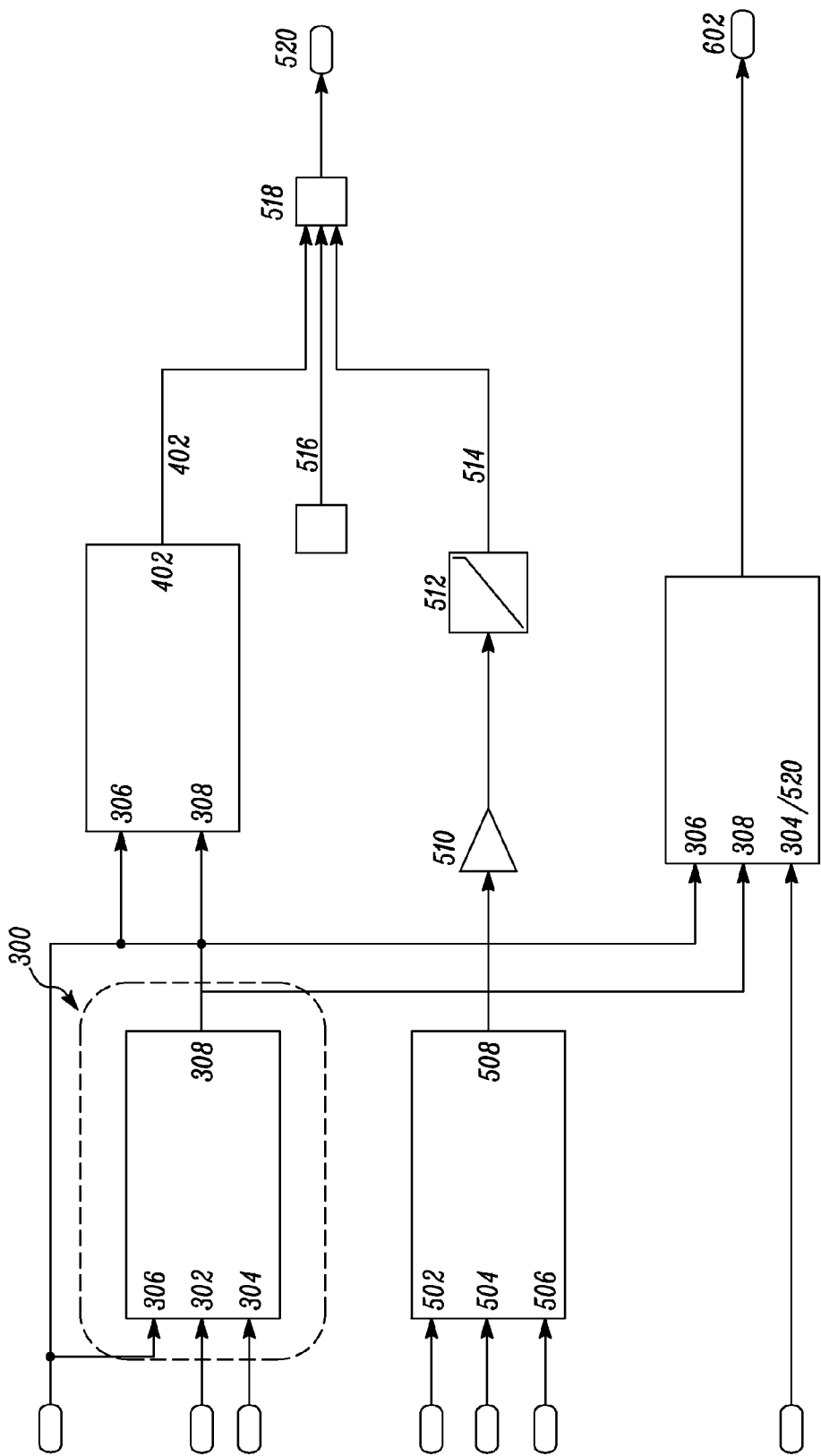
FIG. 3 is a functional block of an operation of a controller to determine a desired output torque to the ground.

As illustrated in FIG. 3, in functional block 300, the controller 124 may receive signals 302, 304 from the impeller clutch pedal sensor 206 and the power source sensor 208 respectively, along with a signal 306 for the current torque converter output speed. The logic circuit in the controller 124 may utilize these signals 302, 304 and 306 to generate a signal 308 indicative of the desired output torque to the ground. The signal 304 from the power source sensor 208 may be indicative of the speed of the power source 102. In one embodiment, the signal 304 may be indicative of the position of the throttle. In the functional block 300, the power source speed may be considered as maximum corresponding to the throttle-lock pedal function. In one embodiment, if the controller 124 does not allow to deactivate the throttle-lock pedal function, then the controller 124 may calculate an extent to which the impeller clutch 116 should be slipped to attain the desired output torque to the ground, at the current torque converter output speed. This functionality of the controller 124 may allow the machine 100 to operate with either throttle-lock pedal function command active or deactivated, as explained in further FIGS. 4-7.

Figure 4:
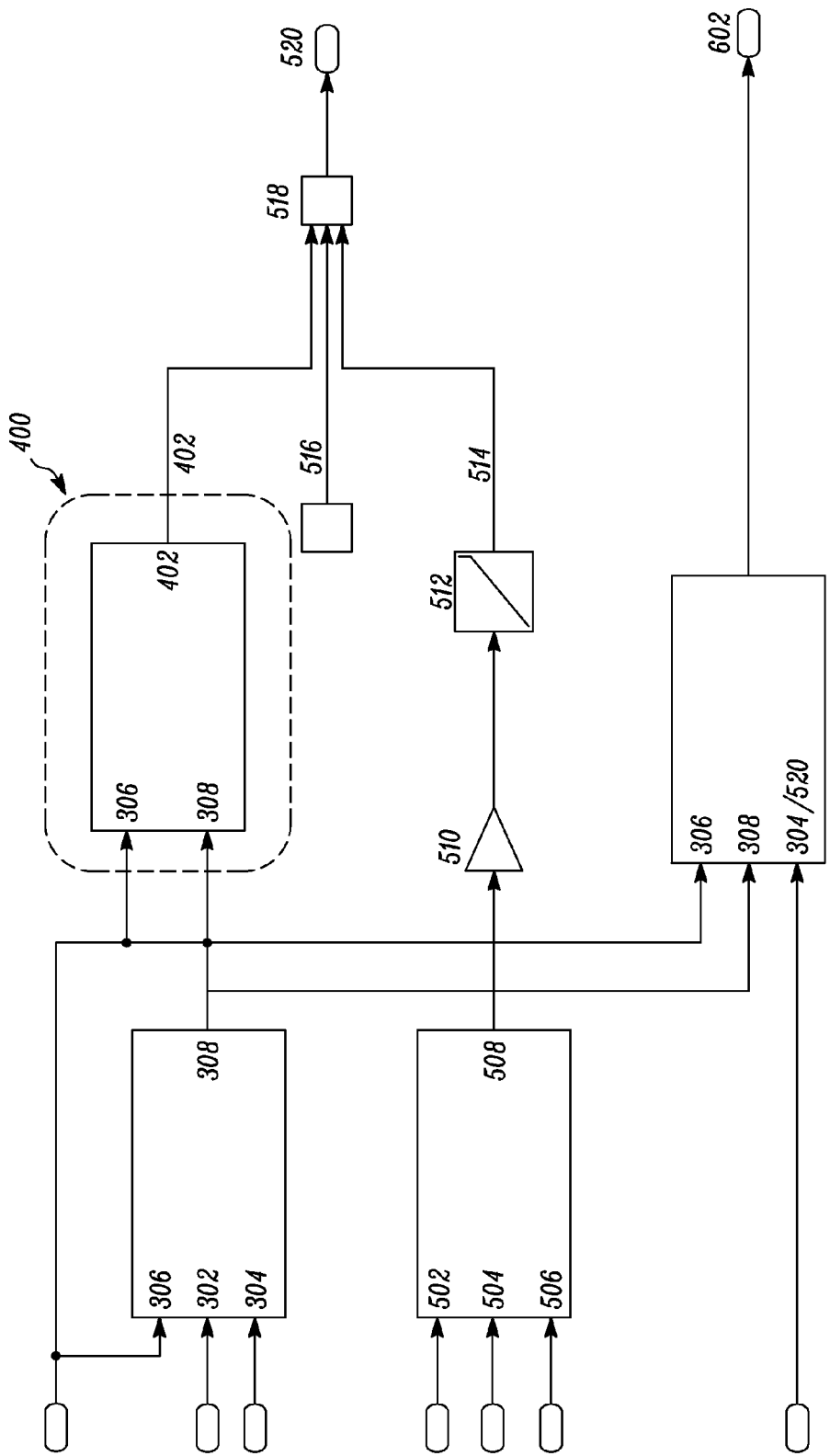
FIG. 4 is a functional block of an operation of the controller to determine a first required speed of the power source corresponding to the desired output torque to the ground.

As illustrated in FIG. 4, in functional block 400, the controller 124 may receive the signals 308, 306 corresponding to the desired output torque to the ground and the current torque converter output speed to generate a signal 402 corresponding to the first required speed of the power source 102. In an embodiment, if there are no hydraulic flow requirement corresponding to the implement lever command, or if the implement 122 is not performing any operations, then the controller 124 may deactivate the throttle-lock pedal function and subsequently, issue the command via the communication line 222 to the power source 102 to vary the power source speed. The power source 102 converts the speed command received from the controller 124 into throttle pedal positions by using the throttle pedal-based desired power source speed map in reverse. Thus, rather than the throttle pedal resulting in a desired power source speed, the received speed command from the controller 124 results in the throttle pedal position. In such a situation, the controller 124 adds to the fuel efficiency of the machine 100, as the throttle-lock pedal function is deactivated and the power source speed is brought down from maximum to the required speed to attain the desired output torque to the ground, at the current torque converter output speed.

Figure 5:
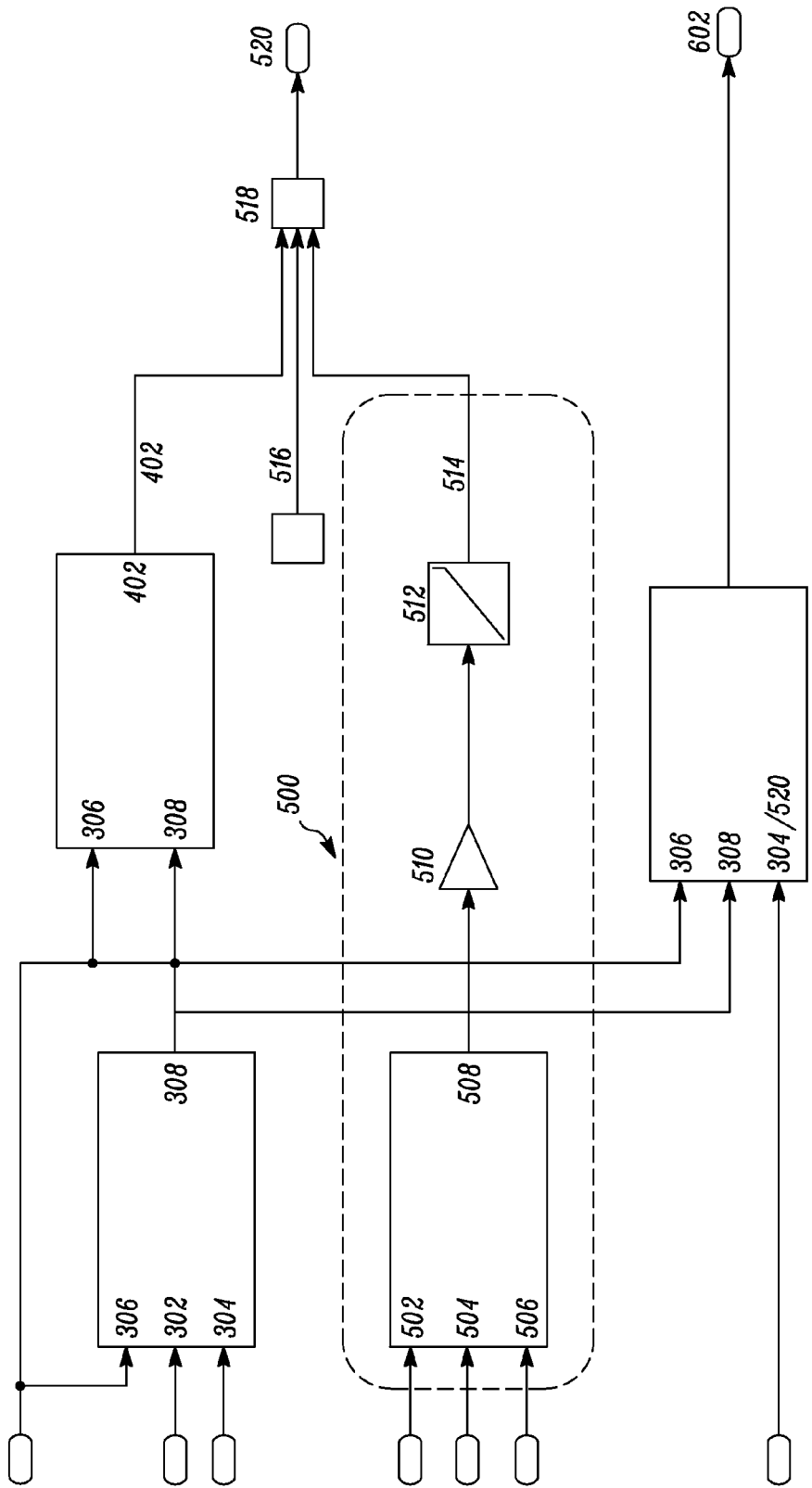
FIG. 5 is a functional block of an operation of the controller to determine a second required speed of the power source corresponding to an implement lever command.

As illustrated in FIG. 5, in the functional block 500, the controller 124 may first determine the desired hydraulic flow corresponding to the implement lever command. The controller 124 may receive signals 502, 504 and 506 corresponding to a lift command, a tilt command, and a steering command, constituting the implement lever command, to generate a signal 508 corresponding to the desired hydraulic flow. The desired hydraulic flow may be required for both the implement and the steering pumps. Subsequently, the signal 508 corresponding to the desired hydraulic flow is processed through a scaling factorization block 510 to allow optimization in the determined desired hydraulic flow, to accommodate an acceptable flow allowable by a powertrain. In one embodiment, the acceptable flow of the powertrain may be obtained through a lookup table using liner interpolation, a map or any other suitable means. After determining the acceptable flow, the controller 124 may utilize a pump-flow map 512 or any other suitable means to translate the signal corresponding to the acceptable flow to a signal 514 corresponding to the second required speed of the power source 102. The second required speed of the power source 102 may meet the desired hydraulic flow corresponding to the implement lever command.

Additionally, the controller 124 may also generate a signal 516 corresponding to a standby speed of the power source 102. The standby speed may be defined as the speed of the power source 102 when the machine 100 is operational with minimal powertrain torque and implement flow demand. Subsequently, the controller 124 may process the signals 402, 514 and 516 corresponding to the first required speed, the second required speed and the standby speed through a speed arbitration block 518, which select the optimum or the most efficient of the three speeds to enable the controller 124 to generate a signal 520 corresponding to the desired speed of the power source 102. The controller 124 may then issue the speed command corresponding to the signal 520 to the power source 102 via the communication line 222 to arrive at the desired speed of the power source 102. The power source 102 converts the speed commands from the controller 124 into throttle pedal positions by using the throttle pedal-based desired power source speed map in reverse. The selection of the optimum speed is done in such a manner that will ensure attaining the desired output torque to the ground and also maintaining the required hydraulic flow corresponding to the implement lever command.

In an embodiment, if the speed (first required speed) of the power source 102 to maintain the desired hydraulic flow corresponding to the implement lever command is greater than the speed (second required speed) of the power source 102 to attain the desired output torque to the ground, then the controller 124 may issue the command to modulate the engagement of the impeller clutch 116, at the current torque converter output speed. Also, if the speed of the power source 102 does not respond fast enough to the change in the desired output torque to the ground, then the controller 124 may issue the command to modulate the engagement of the impeller clutch 116.

Figure 6:
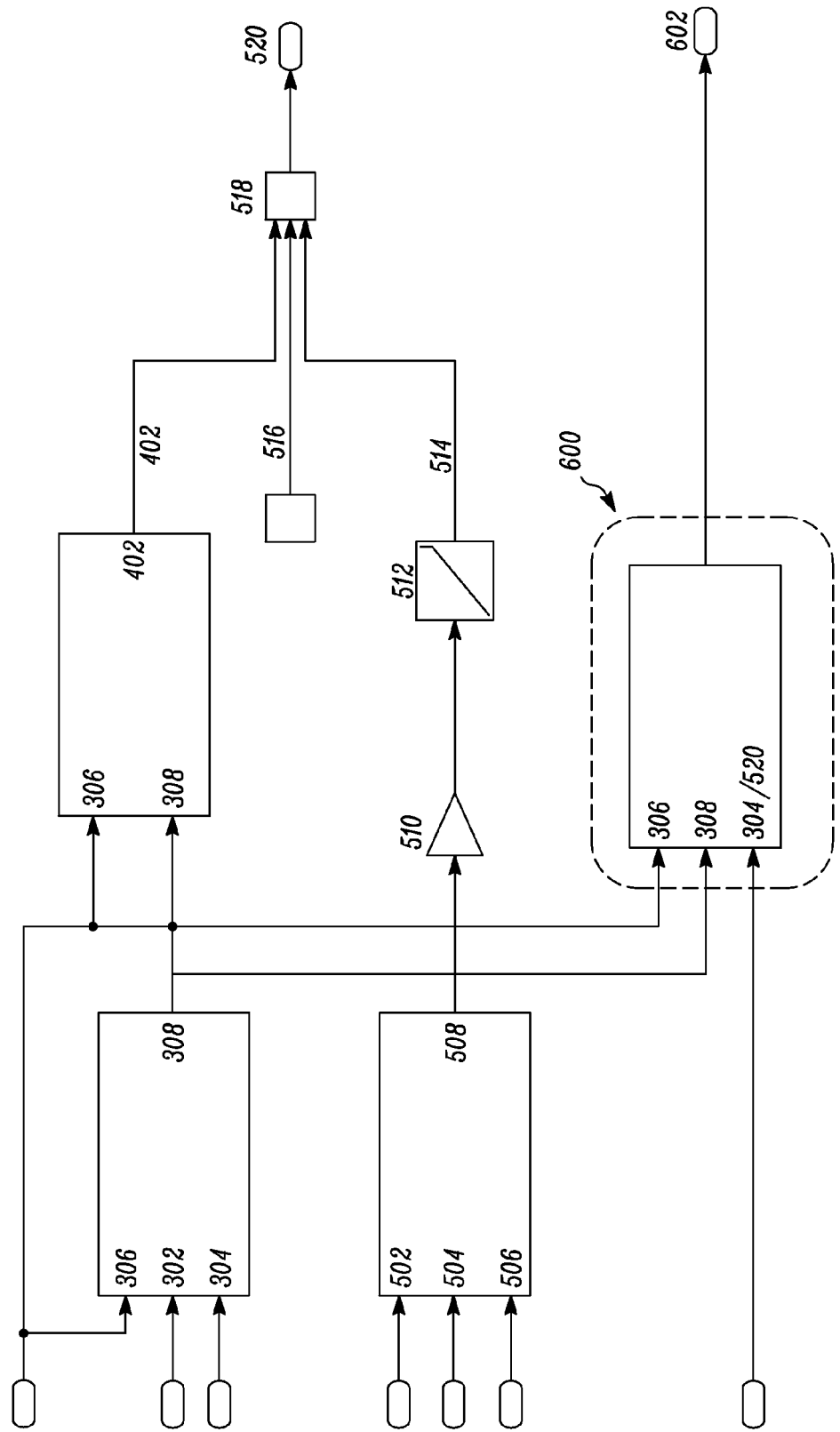
FIG. 6 is functional block of an operation of the controller to determine a desired level of engagement of an impeller clutch.

As illustrated in FIG. 6, in functional block 600, the controller 124 may receive signals 304/520, 306, and 308 corresponding to the actual speed of the power source 102 or the desired speed of the power source 102, the current torque converter output speed and the determined desired output torque to the ground and subsequently generate a signal 602 corresponding to a desired level of engagement of the impeller clutch 116. In an embodiment, the actual speed of the power source 102 is a current speed of the power source 102 required to meet the minimum hydraulic flow requirement corresponding to the implement lever command. The desired level of engagement of the impeller clutch 116 may provide the degree by which the impeller clutch 116 may need to be slipped. Further, in another embodiment, the controller 124 may issue the command corresponding to the signal 602 to the impeller clutch 116 to modulate the desired level of engagement of the impeller clutch 116.

Figure 7:
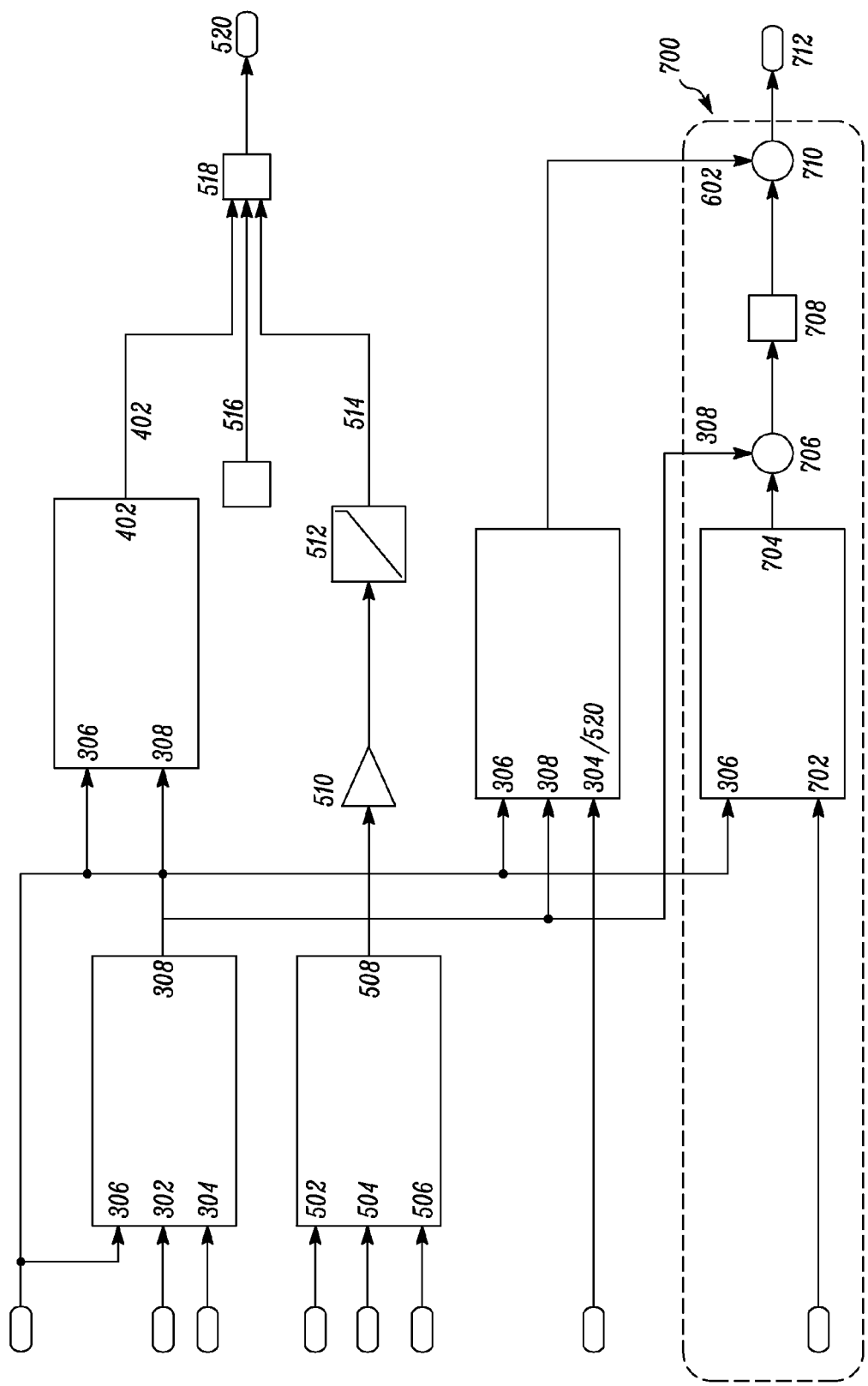
FIG. 7 is functional block of an operation of the controller to provide a closed loop feedback control to determine a desired level of engagement of the impeller clutch.

In some cases, there may be some internal variations in the components of the controller 124, and the machine 100, for example break in or wear out of the impeller clutch 116, and the like. This may lead to an inaccurate determination of the engagement of the impeller clutch 116 to achieve the desired output torque to the ground or the determined engagement of the impeller clutch 116 may not achieve the desired output torque to the ground. As illustrated in FIG. 7, in functional block 700, the controller 124 may utilize a closed loop feedback control to determine any inaccuracies in the calculation of the engagement of the impeller clutch 116. The controller 124 may receive signals 702, 306 corresponding to the impeller speed and the current torque converter output speed to generate a signal 704 corresponding to the desired torque output to the ground. Subsequently, the controller 124 processes the signal 704 and the signal 308 through an error correction block 706 to identify error in the desired torque output to the ground. The controller 124 further iterates the process with the proportional integral derivative control block 708 to identify the required correction in the engagement of the impeller clutch 116. The identified correction is subjected to the signal 602 (identified at step 600) in an error correction block 710, to subsequently generate a revised signal 712 corresponding to the engagement of the impeller clutch 116.

Subsequently, based on the obtained correction provided by the closed loop feedback control, the controller 124 may issue the command corresponding to the signal 712 to modulate the level of engagement of the impeller clutch 116. A person of ordinary skill in the art will appreciate that the impeller speed sensor may assist in improving the overall accuracy and performance of the functioning of the controller 124.

Figure 8:
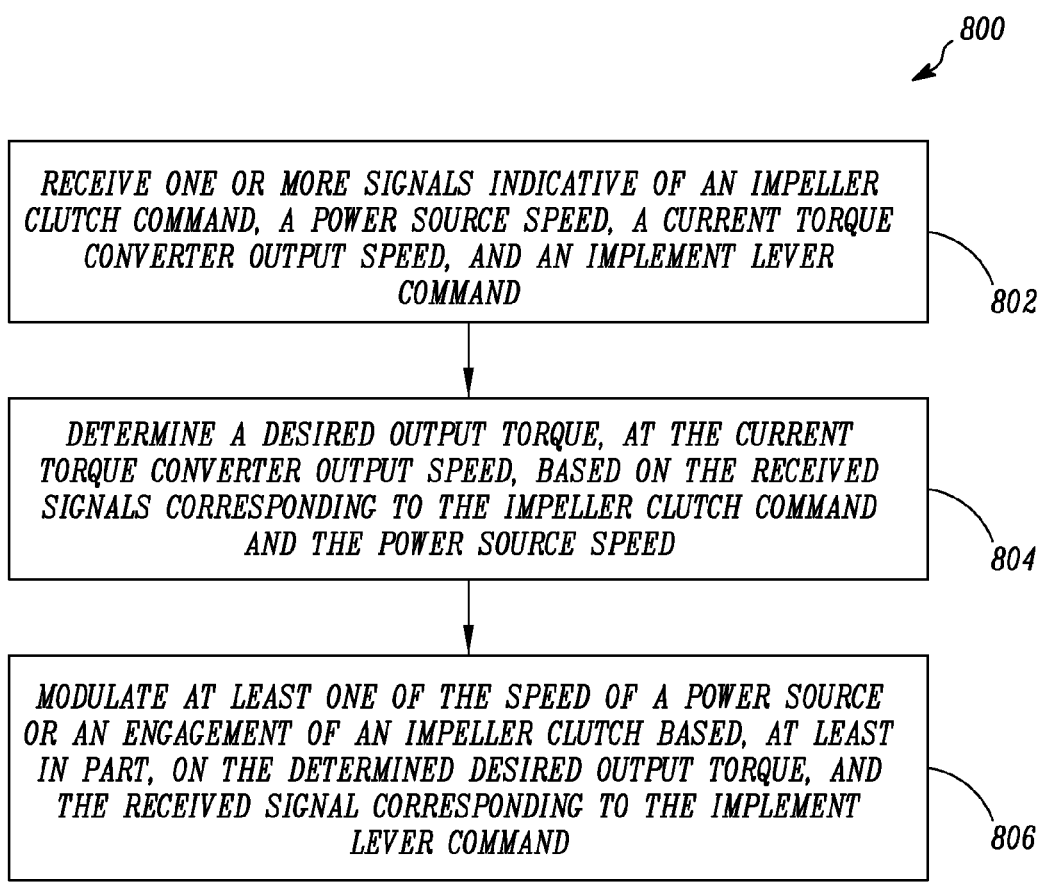
FIG. 8 is a process flow of an operation of the controller.

In an embodiment, any controller having a processor or any other entity capable of running an algorithm may execute the process 800 as illustrated in FIG. 8. In step 802, the controller 124 may receive one or more signals indicative of an impeller clutch command, a power source speed, a current torque converter output speed and an implement lever command. Subsequently, at step 804, the controller 124 may determine a desired output torque, at the current torque converter output speed, based on the received signals corresponding to the impeller clutch command and the power source speed. Consequently, at step 806, the controller 124 may generate one or more signals to modulate at least one of the speed of a power source 102 or an engagement of an impeller clutch 116 based, at least in part, on the determined desired output torque, and the received signal corresponding to the implement lever command.

A person of ordinary skill in the art will appreciate that the FIGS. 3 to 8 are merely on an exemplary basis. The sequence of the steps and the control logic described above does not limit the scope of this disclosure. Other similar techniques used to achieve a desired output torque by modulating the speed of the power source 102 and/or the engagement of the impeller clutch 116 or the use of transmission 106 clutches may also be used.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A machine control system comprising:
   an impeller clutch pedal sensor configured to generate a signal indicative of an impeller clutch command;
   a power source sensor configured to generate a signal indicative of a speed of a power source;
   a torque converter sensor configured to generate a signal indicative of a current torque converter output speed;
   an implement lever sensor configured to generate a signal indicative of an implement lever command; and
   a controller in communication with the impeller clutch pedal sensor, the implement lever sensor, the torque converter sensor and the power source sensor, the controller being configured to:
      determine a desired output torque, at the current speed of the torque converter output speed, based on the signals from the impeller clutch pedal sensor and the power source sensor;
      determine a first required speed of the power source, at the current torque converter output speed, corresponding to the desired output torque;
      determine a second required speed of the power source corresponding to the implement lever command;
      compare the first and second required speeds of the power source;
      select a higher of the first and second required speeds as the desired speed of the power source; and
      modulate at least one of the speed of the power source or an engagement of an impeller clutch based, at least in part, on the desired speed of the power source and the implement lever command.

2. The machine control system of claim 1, wherein the impeller clutch pedal sensor is coupled with an impeller clutch pedal, and wherein the impeller clutch pedal sensor is configured to generate a signal indicative of an actuating force on the impeller clutch pedal.

3. The machine control system of claim 2, wherein the impeller clutch pedal is movable through a range from a neutral position to a maximum displaced position upon actuation of a force, and the range includes a deadband where substantially no change in the actuating force is affected.

4. The machine control system of claim 3, wherein the deadband includes a portion of the range from the neutral position to about 6% of the maximum displaced position.

5. The machine control system of claim 1, wherein the signal indicative of the speed of the power source indicates a throttle position of the power source.

6. The machine control system of claim 1, wherein the implement lever command includes at least one of a steering command, lift command, or a tilt command.

7. The machine control system of claim 1, wherein the controller is further configured to determine a desired hydraulic flow for an implement operation corresponding to the implement lever command.

8. The machine control system of claim 1, wherein the controller is further configured to determine a desired level of engagement of the impeller clutch, at the current torque converter output speed, based on the desired output torque, if the desired speed of the power source is greater than the first required speed of the power source.

9. The machine control system of claim 1 further includes an impeller speed sensor configured to generate a signal indicative of impeller speed.

10. The machine control system of claim 9, wherein the signal indicative of the impeller speed is used in a closed loop feedback control to determine a desired level of engagement of an impeller clutch.

11. A method comprising:
    receiving one or more signals indicative of an impeller clutch command, a power source speed, a current torque converter output speed and an implement lever command;
    determining a desired output torque, at the current torque converter output speed, based on the received signals corresponding to the impeller clutch command and the power source speed;
    determining a first required speed of a power source, at the current torque converter output speed, corresponding to the desired output torque;
    determining a second required speed of the power source corresponding to the implement lever command;
    comparing the first and second required speeds of the power source;
    selecting a higher of the first and second required speeds as the desired speed of the power source; and
    modulating at least one of the speed of the power source or an engagement of an impeller clutch based, at least in part, on the determined desired speed of the power source, and the received signal corresponding to the implement lever command.

12. The method of claim 11, wherein receiving the signal indicative of the impeller clutch command provides an indication of an actuating force on an impeller clutch.

13. The method of claim 11, wherein receiving the signal indicative of power source speed provides an indication of a throttle position.

14. The method of claim 11 further includes determining a desired hydraulic flow corresponding to the implement lever command.

15. The method of claim 11, wherein the implement lever command includes at least one of a lift command, a tilt command and a steering command.

16. The method of claim 11 further includes determining a desired level of engagement of the impeller clutch, at the current torque converter output speed, based on the desired output torque if the desired speed of the power source is greater than the first required speed of the power source.

17. The method of claim 11 further includes receiving a signal indicative of an impeller speed.

18. The method of claim 17 further includes determining a desired output torque based on the signal corresponding to the impeller speed in a closed loop feedback control.

19. A machine, comprising:
    a power source coupled through a torque converter to a transmission;
    an impeller clutch configured to connect to an output of the power source with an input of the torque converter;
    an implement configured to receive a hydraulic flow from the power source to perform one or more operations;
    a plurality of sensors configured to generate signals indicative of a speed of the power source, an impeller clutch command, a current torque converter output speed and an implement lever command; and
    a controller in communication with the plurality of sensors, the impeller clutch, and the power source, the controller being configured to:
       determine a desired output torque, at the current torque converter output speed, based on the received signals corresponding to the impeller clutch command and the power source speed;
       determine a first required speed of the power source, at the current torque converter output speed, corresponding to the desired output torque;

determine a second required speed of the power source corresponding to the implement lever command;

compare the first and second required speeds of the power source;

select a higher of the first and second required speeds as the desired speed of the power source; and modulate at least one of the speed of the power source or an engagement of the impeller clutch based, at least in part, on the determined desired speed of the power source and the received signal corresponding to the implement lever command.

20. A computer based system for modulating an output of a torque controller comprising:

a communication interface communicating with a memory;

the memory configured to communicate with a processor; and the processor, in response to executing a computer program, performs operations comprising:

receiving one or more signals indicative of an impeller clutch command, a power source speed, a current torque converter output speed, and an implement lever command;

determining a desired output torque, at the current torque converter output speed, based on the received signals corresponding to the impeller clutch command and the power source speed;

determining a first required speed of a power source, at the current torque converter output speed, corresponding to the desired output torque;

determining a second required speed of the power source corresponding to the implement lever command;

comparing the first and second required speeds of the power source;

selecting a higher of the first and second required speeds as the desired speed of the power source; and modulating at least one of the speed of the power source or an engagement of an impeller clutch based, at least in part, on the determined desired speed of the power source and the received signal corresponding to the implement lever command.

21. The machine control system of claim 7, wherein the controller is further configured to:

determine an active throttle-lock function based on the signal from the power source sensor; and deactivate the throttle-lock function and modulate the power source speed based on the first required speed when the desired hydraulic flow for the implement operation is determined to be zero.

22. The method of claim 14 further includes:

determining an active throttle-lock function based on the signal from the power source sensor; and deactivating the throttle-lock function and modulating the power source speed based on the first required speed when the desired hydraulic flow for the implement operation is determined to be zero.

* * * * *